United States Patent
Suito et al.

(10) Patent No.: US 7,079,751 B2
(45) Date of Patent: Jul. 18, 2006

(54) BROADCAST SIGNAL RECORDING AND PLAYBACK APPARATUS AND METHOD AS WELL AS RECORDING MEDIUM

(75) Inventors: Taro Suito, Kanagawa (JP); Masashi Ohta, Tokyo (JP)

(73) Assignee: Sony Corporation, Tokyo (JP)

( * ) Notice: Subject to any disclaimer, the term of this patent is extended or adjusted under 35 U.S.C. 154(b) by 1134 days.

(21) Appl. No.: 09/903,163

(22) Filed: Jul. 11, 2001

(65) Prior Publication Data
US 2002/0015574 A1 Feb. 7, 2002

(30) Foreign Application Priority Data
Jul. 13, 2000 (JP) .......................... P2000-212297

(51) Int. Cl.
*H04N 5/91* (2006.01)
(52) U.S. Cl. ............................ 386/46; 386/83; 386/95
(58) Field of Classification Search ................. 386/46, 386/95, 96, 83; 358/907
See application file for complete search history.

(56) References Cited
U.S. PATENT DOCUMENTS
6,285,818 B1 * 9/2001 Suito et al. .................. 386/46

FOREIGN PATENT DOCUMENTS
JP 10-224722 A * 8/1998

* cited by examiner

*Primary Examiner*—Huy Nguyen
(74) *Attorney, Agent, or Firm*—Oblon, Spivak, McClelland, Maier & Neustadt, P.C.

(57) ABSTRACT

The invention provides a broadcast signal recording and playback apparatus and method which can detect a CM included in a television broadcast signal with certainty without an error. A CM candidate period detection section detects a CM using an audio mode signal outputted from a tuner, a sound absence discrimination output from a sound absence detection section and a scene change detection output from a scene change detection section as basic materials. A detection operation discrimination section limits operation of the CM candidate period detection section when it is known that the broadcast signal includes no CM or when the electric field is weak.

9 Claims, 17 Drawing Sheets

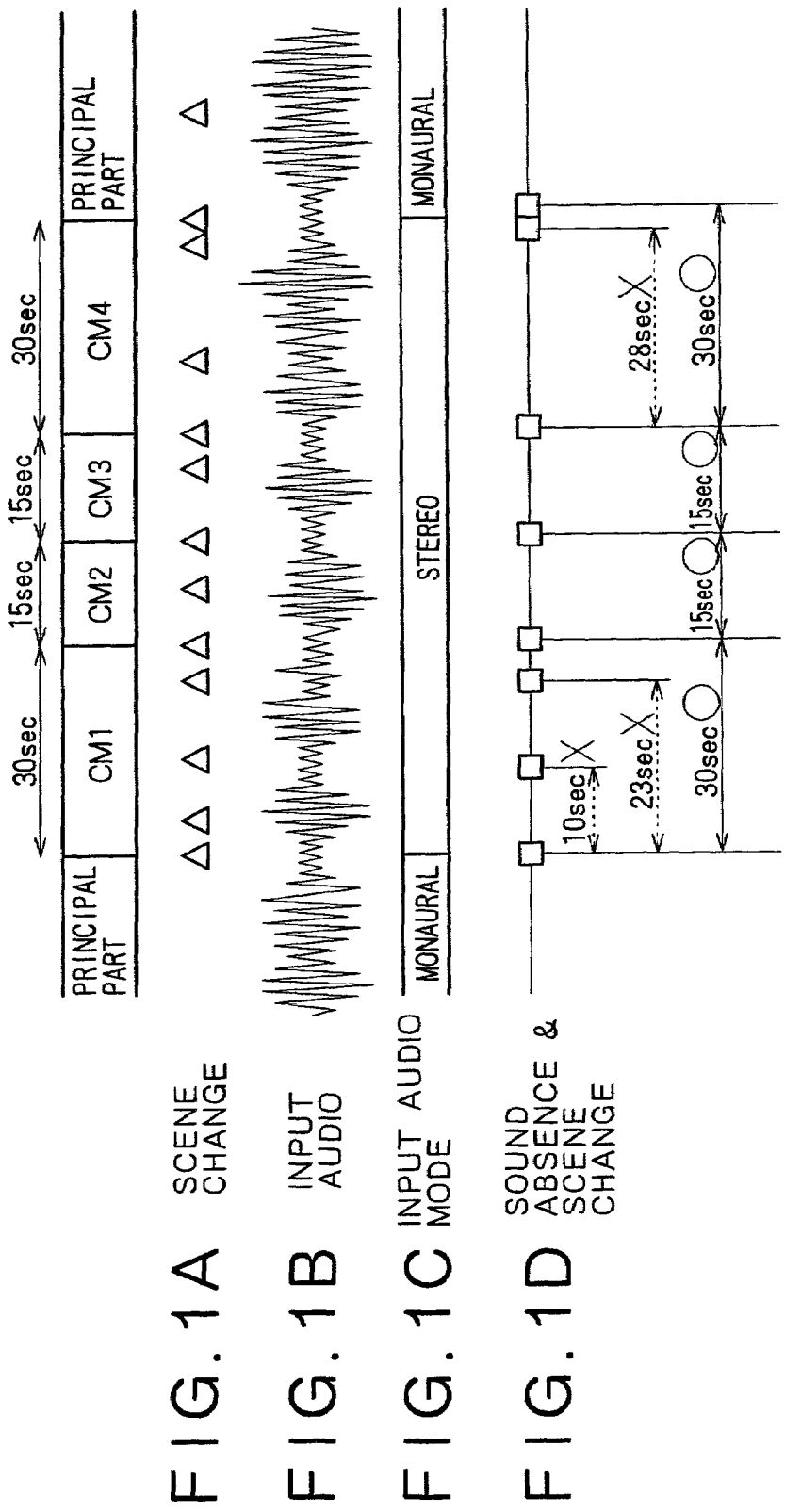

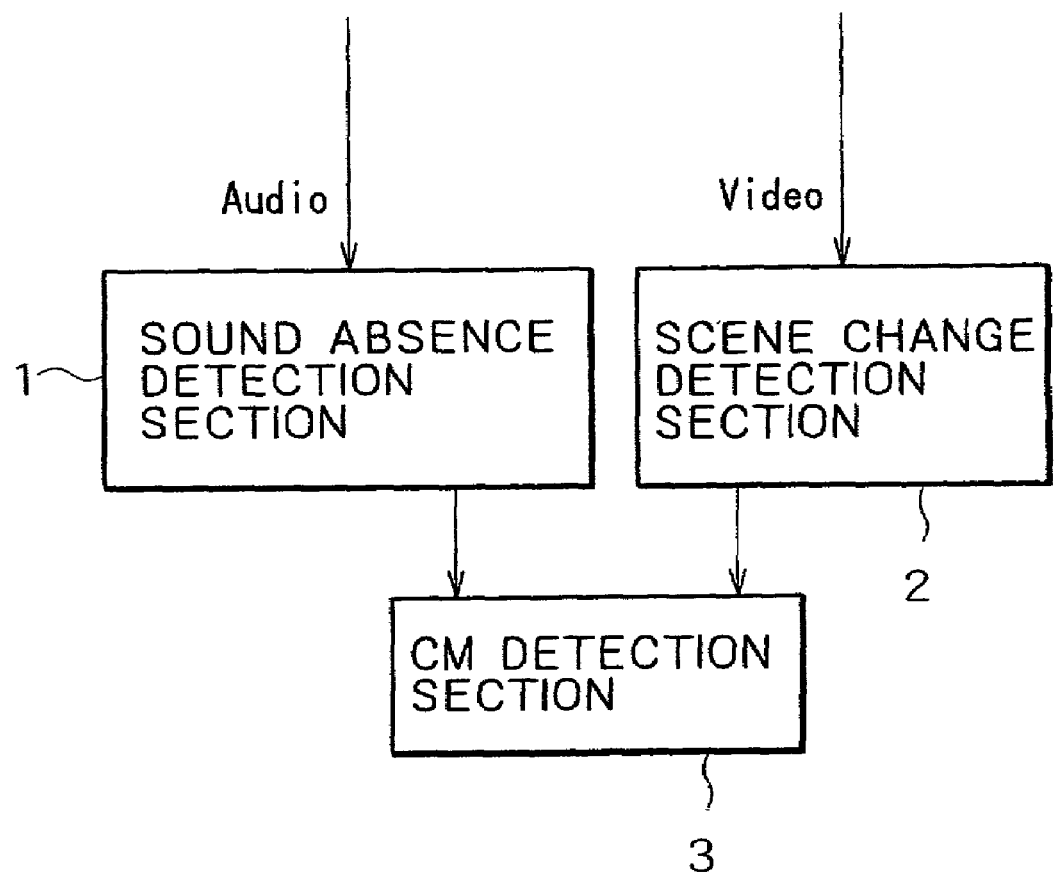

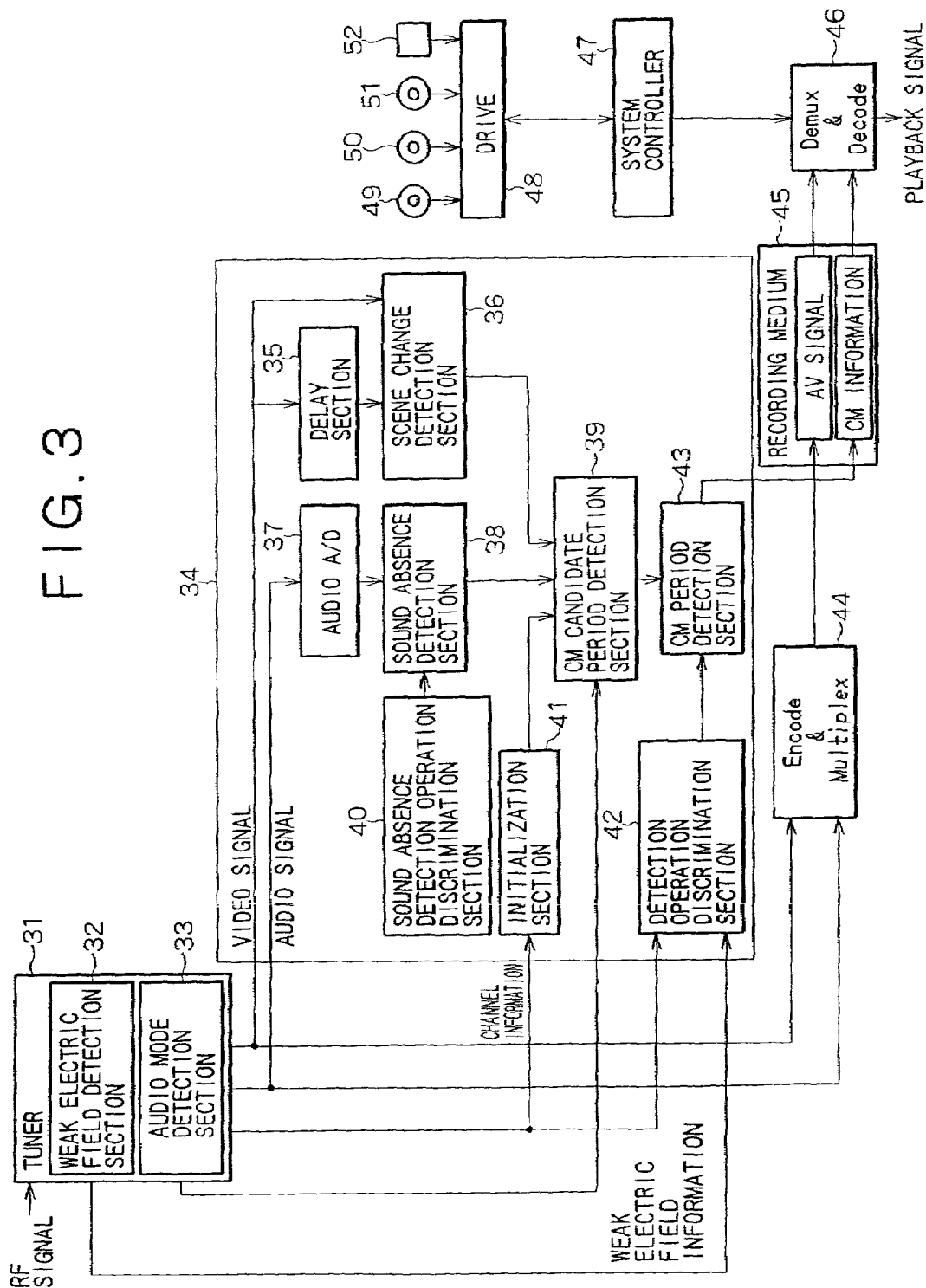

FIG.6
DELAYED VIDEO 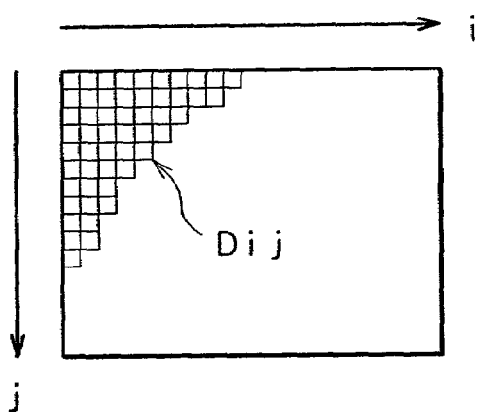 THROUGH VIDEO 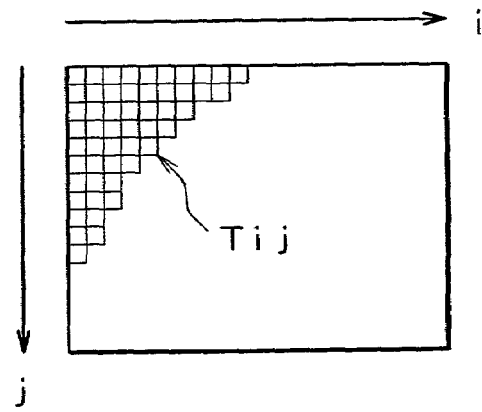
$$E = \Sigma\Sigma abs(Dij - Tij)$$

FIG. 8

| FRAME NUMBER | 0 | 1 | 2 | 3 | 4 | 5 | 6 | 7 | 8 | 9 | 10 | 11 | 12 | 13 | ... | 450 | 451 | 452 | 453 | 454 | 455 | 456 | 457 | ... |
|---|---|---|---|---|---|---|---|---|---|---|---|---|---|---|---|---|---|---|---|---|---|---|---|---|
| SOUND ABSENCE DETECTION OUTPUT | 0 | 1 | 1 | 1 | 1 | 0 | 0 | 0 | 0 | 0 | 0 | 0 | 0 | 0 | ... | 0 | 1 | 1 | 1 | 1 | 0 | 0 | 0 | ... |
| SCENE CHANGE DETECTION OUTPUT | 0 | 1 | 1 | 0 | 0 | 0 | 0 | 0 | 0 | 0 | 0 | 0 | 0 | 0 | ... | 0 | 0 | 1 | 0 | 0 | 0 | 0 | 0 | ... |
| AUDIO MODE OUTPUT | 0 | 1 | 1 | 1 | 1 | 1 | 1 | 1 | 1 | 1 | 1 | 1 | 1 | 1 | ... | 1 | 1 | 1 | 1 | 0 | 0 | 0 | 0 | ... |

450 FRAMES = 15 seconds

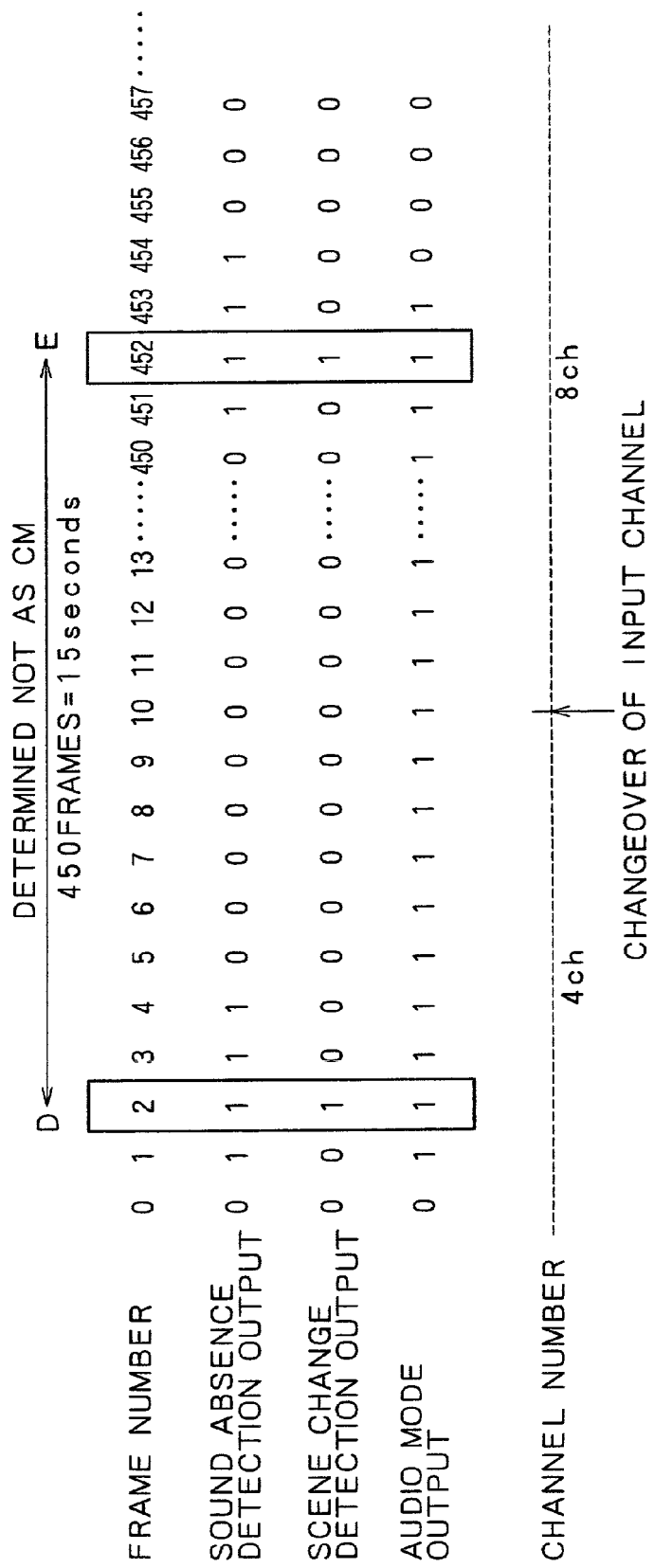

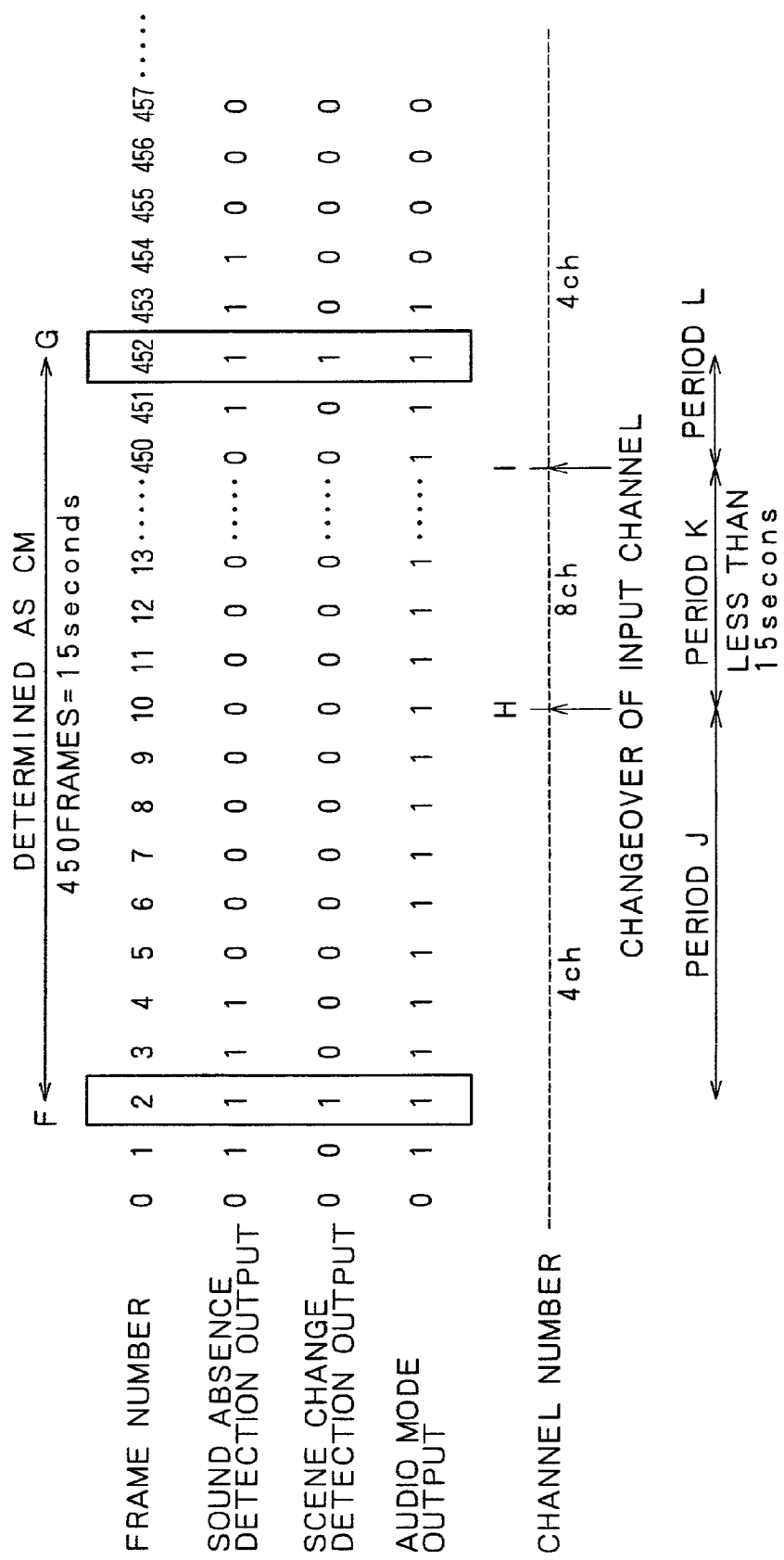

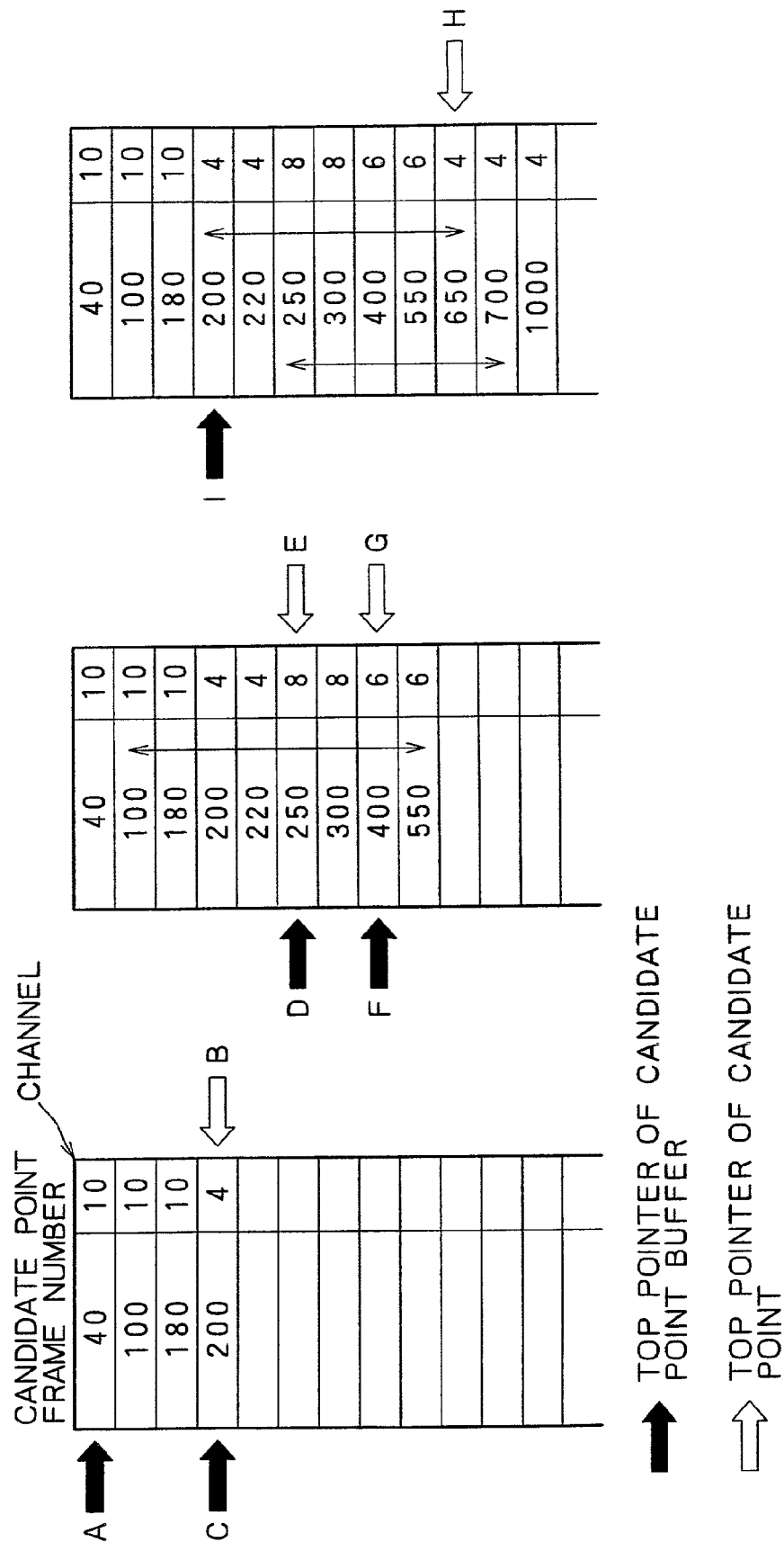

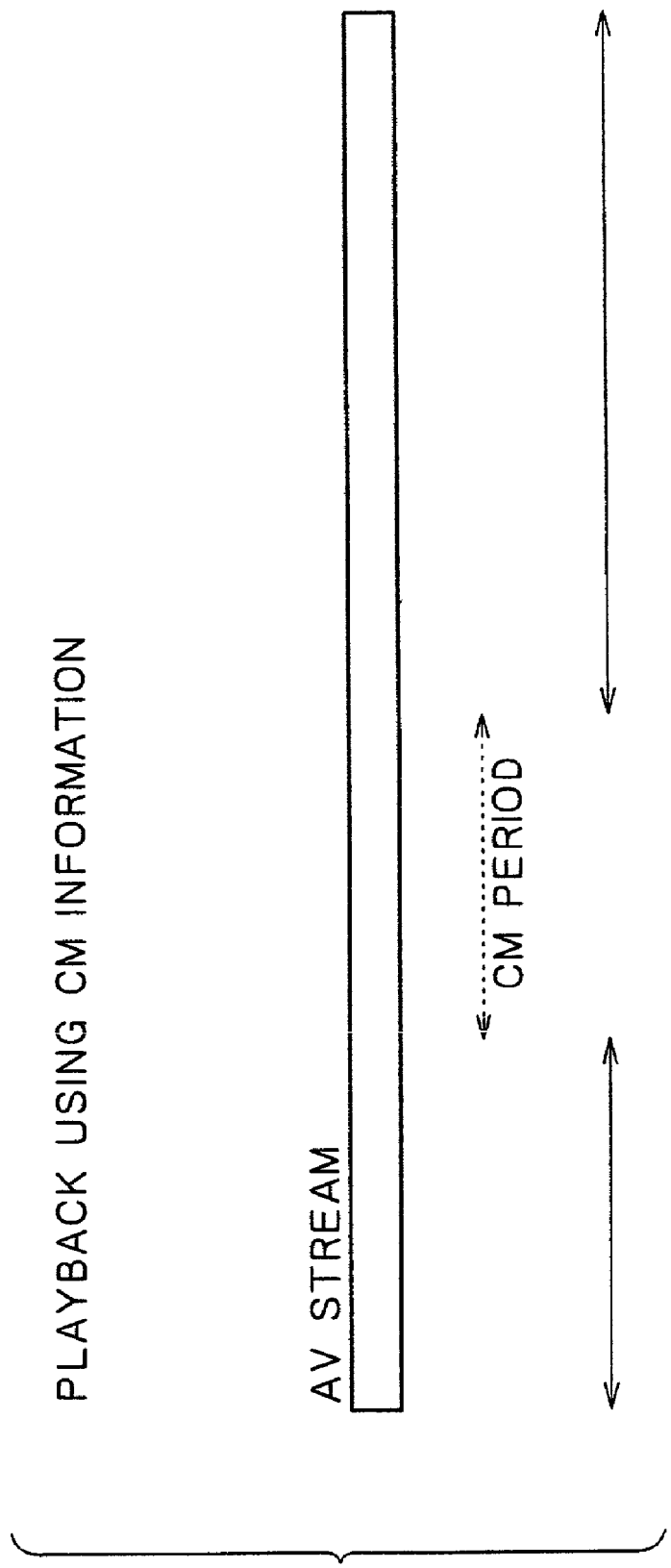

BROADCAST SIGNAL RECORDING AND PLAYBACK APPARATUS AND METHOD AS WELL AS RECORDING MEDIUM

BACKGROUND OF THE INVENTION

This invention relates to a broadcast signal recording and playback apparatus and method as well as a recording medium, and more particularly to a broadcast signal recording and playback apparatus and method as well as a recording medium suitable for use to record or play back, for example, a television signal in which a CM (commercial message) is included.

Where a television broadcast signal is received and recorded into a recording and playback apparatus for an AV signal such as a video tape recorder, a CM is detected in order to play back the television broadcast signal skipping only CM portions or to record the television signal except CM portions.

Conventionally, a CM is detected making use of the facts that generally a sound absence period for approximately 0.1 second to 2 seconds appears with a high probability at a start point and an end point of each CM, that a scene changing point of an image is present within a sound absence period, the time required for each CM is an integral number of times 15 seconds and the audio mode in a CM broadcasting period is a stereo mode as seen in FIGS. 1A to 1D.

In particular, if a scene changing point within a sound absence period appears after an interval of time equal to an integral number of times 15 seconds and a stereo audio is broadcast within a period cut out with a time length of an integral number of times 15 second, it is discriminated that the period is a CM period.

An example of configuration of a conventional CM detection apparatus is shown in FIG. 2. Referring to FIG. 2, a sound absence period in an audio signal included in a broadcast signal is detected by a sound absence detection section 1 while a scene change in a video signal included in the broadcast signal is detected by a scene change detection section 2. Then, a CM in the broadcast signal is detected by a CM detection section 3 based on the sound absence period detected by the sound absence detection section 1 and the scene change detected by the scene change detection section 2. The audio signal and the video signal are multiplexed and recorded onto a recording medium not shown. A result of the CM detection by the CM detection section 3 may be recorded onto the recording medium together with a stream of the AV signal or may be recorded into a memory such as a semiconductor memory different from the recording medium on which the AV signal is recorded.

Upon recording, CM detection is performed and a result of the detection is recorded. Then upon playback, an AV signal is played back, for example, with a CM skipped based on the recorded result of the CM detection.

Since such an algorithm as described above is conventionally used to detect a CM, the conventional CM detection is disadvantageous in that, if the AV signal has a pattern which complies with the algorithm, then the portion of the AV signal is detected as a CM in error even if it is not a CM period.

The conventional CM detection is further advantageous in that it cannot detect a rarely found CM which does not have a pattern which complies with the algorithm.

SUMMARY OF THE INVENTION

It is an object of the present invention to provide a broadcast signal recording and playback apparatus and method which can detect a CM included in a television broadcast signal with certainty without an error.

In order to attain the object described above, according to an aspect of the present invention, there is provided a broadcast signal recording and playback apparatus for recording and playing back a television broadcast signal onto and from an information recording medium, comprising sound absence period detection means for detecting a sound absence period of an audio signal included in the television broadcast signal, audio mode detection means for detecting an audio mode of the audio signal of the television broadcast signal, scene changing point detection means for detecting a scene changing point of a video signal included in the television broadcast signal, scene changing point distance measurement means for measuring the distance between scene changing points successively detected by the scene changing point detection means, CM detection means for using at least one of the sound absence period, the audio mode and the distance between scene changing points as a parameter to detect a CM included in the television broadcast signal, CM detection control means for controlling the CM detection means, sound absence period detection control means for controlling the sound absence period detection means, and initialization means for initializing the parameter or parameters.

Preferably, the CM detection control means limits the processing of the CM detection means when it is known that the television broadcast signal includes no CM.

Preferably, the CM detection control means limits the processing of the CM detection means when the television broadcast signal has a low signal level.

Preferably, the CM detection control means controls the CM detection means to start its processing before recording of the television broadcast signal is started.

The sound absence period detection control means may limit the processing of the sound absence period detection means at a predetermined point of time.

The initialization means may initialize the parameter or parameters when discontinuity occurs with the television broadcast signal.

The initialization means may restore the initialized parameter or parameters when the television broadcast signal recovers after discontinuity occurs with the television broadcast signal.

According to another aspect of the present invention, there is provided a broadcast signal recording and playback method for a broadcast signal recording and playback apparatus for recording and playing back a television broadcast signal onto and from an information recording medium, comprising a sound absence period detection step of detecting a sound absence period of an audio signal included in the television broadcast signal, an audio mode detection step of detecting an audio mode of the audio signal of the television broadcast signal, a scene changing point detection step of detecting a scene changing point of a video signal included in the television broadcast signal, a scene changing point distance measurement step of measuring the distance between scene changing points successively detected by the processing in the scene changing point detection step, a CM detection step of using at least one of the sound absence period, the audio mode and the distance between scene changing points as a parameter to detect a CM included in the television broadcast signal, a CM detection control step of controlling the processing of the CM detection step, a sound absence period detection control step of controlling the processing of the sound absence period detection step, and an initialization step of initializing the parameter or parameters.

According to a further aspect of the present invention, there is provided a recording medium on which a computer-readable program for controlling a broadcast signal recording and playback apparatus for recording and playing back a television broadcast signal onto and from an information recording medium is recorded, the program comprising a sound absence period detection step of detecting a sound absence period of an audio signal included in the television broadcast signal, an audio mode detection step of detecting an audio mode of the audio signal of the television broadcast signal, a scene changing point detection step of detecting a scene changing point of a video signal included in the television broadcast signal, a scene changing point distance measurement step of measuring the distance between scene changing points successively detected by the processing in the scene changing point detection step, a CM detection step of using at least one of the sound absence period, the audio mode and the distance between scene changing points as a parameter to detect a CM included in the television broadcast signal, a CM detection control step of controlling the processing of the CM detection step, a sound absence period detection control step of controlling the processing of the sound absence period detection step, and an initialization step of initializing the parameter or parameters.

In the broadcast signal recording and playback apparatus and method as well as the program of the recording medium, a sound absence period of an audio signal included in a television broadcast signal is detected, and an audio mode of the audio signal of the television broadcast signal is detected. Further, a scene changing point of a video signal included in the television broadcast signal is detected, and the distance between scene changing points successively detected in this manner is measured. Then, at least one of the sound absence period, the audio mode and the distance between scene changing points is used as a parameter to detect a CM included in the television broadcast signal. Further, the processing of the CM detection is controlled and the processing of the sound absence period detection is controlled, and the parameter or parameters are initialized. Therefore, a CM included in the television broadcast signal can be detected with certainty and without an error.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1A to 1D are waveform diagrams illustrating an algorithm of conventional CM detection;

FIG. 2 is a block diagram showing an example of configuration of a conventional CM detection system;

FIG. 3 is a block diagram showing an example of configuration of an AV signal recording and playback apparatus to which the present invention is applied;

FIG. 6 is a diagrammatic view illustrating calculation of an interframe correlation value;

FIG. 8 is a diagrammatic view illustrating a basic CM detection algorithm;

FIGS. 15 and 16 are diagrammatic views illustrating operation of an initialization section shown in FIG. 3;

FIGS. 17A to 17C are diagrammatic views illustrating operation of the initialization section shown in FIG. 3; and FIG. 18 is a diagrammatic view illustrating a playback method in which CM information is used.

DESCRIPTION OF THE PREFERRED EMBODIMENT

Figure 4A:
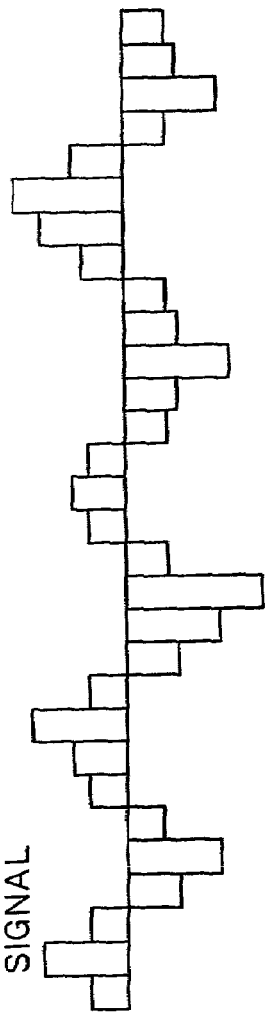
FIGS. 4A to 4C are diagrams illustrating a concept of a process for detection of a sound absence period.

Referring to FIG. 3, there is shown an example of configuration of an AV signal recording and playback apparatus to which the present invention. In the apparatus, a RF signal inputted to a tuner 31 is demultiplexed into an audio signal and a video signal, which are inputted to a CM detection block 34. The CM detection block 34 is formed from a microcomputer. A result of CM detection of the CM detection block 34 is recorded as CM information together with the AV signal onto a recording medium 45.

The recording medium 45 may be a hard disk or any other recording medium such as a tape medium, a magneto-optical disk, a magnetic disk or a semiconductor memory. Alternatively, the CM detection result may be recorded onto a recording medium different from a recording medium onto which the AV signal is recorded.

The audio signal from the tuner 31 is digitized, discretized with a predetermined sampling frequency and quantized with a predetermined quantization level (for example, a sampling frequency of 16 KHz and a quantization level of 10 bits) by an audio A/D (analog/digital) converter 37. The digitized audio data is supplied to a sound absence detection section 38.

Figure 4B:
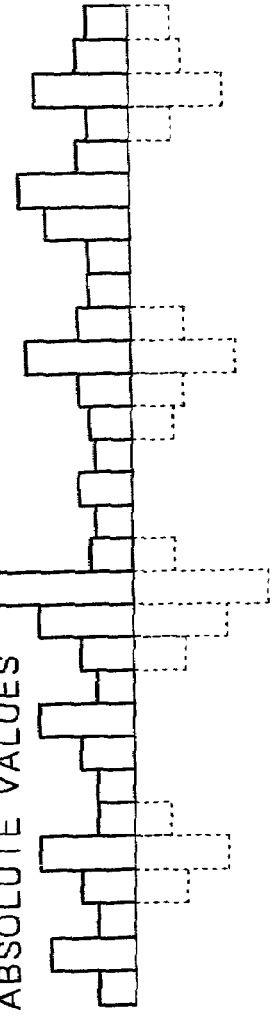
Figure 4C:
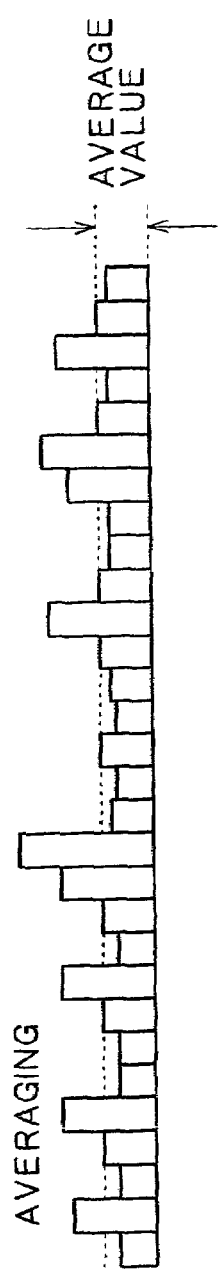

The sound absence detection section 38 calculates an average audio level of each frame and compares it with a predetermined threshold value to discriminate whether sound is present or absent. A discrimination process for presence or absence of sound is described below with reference to FIGS. 4 and 5.

Figure 5:
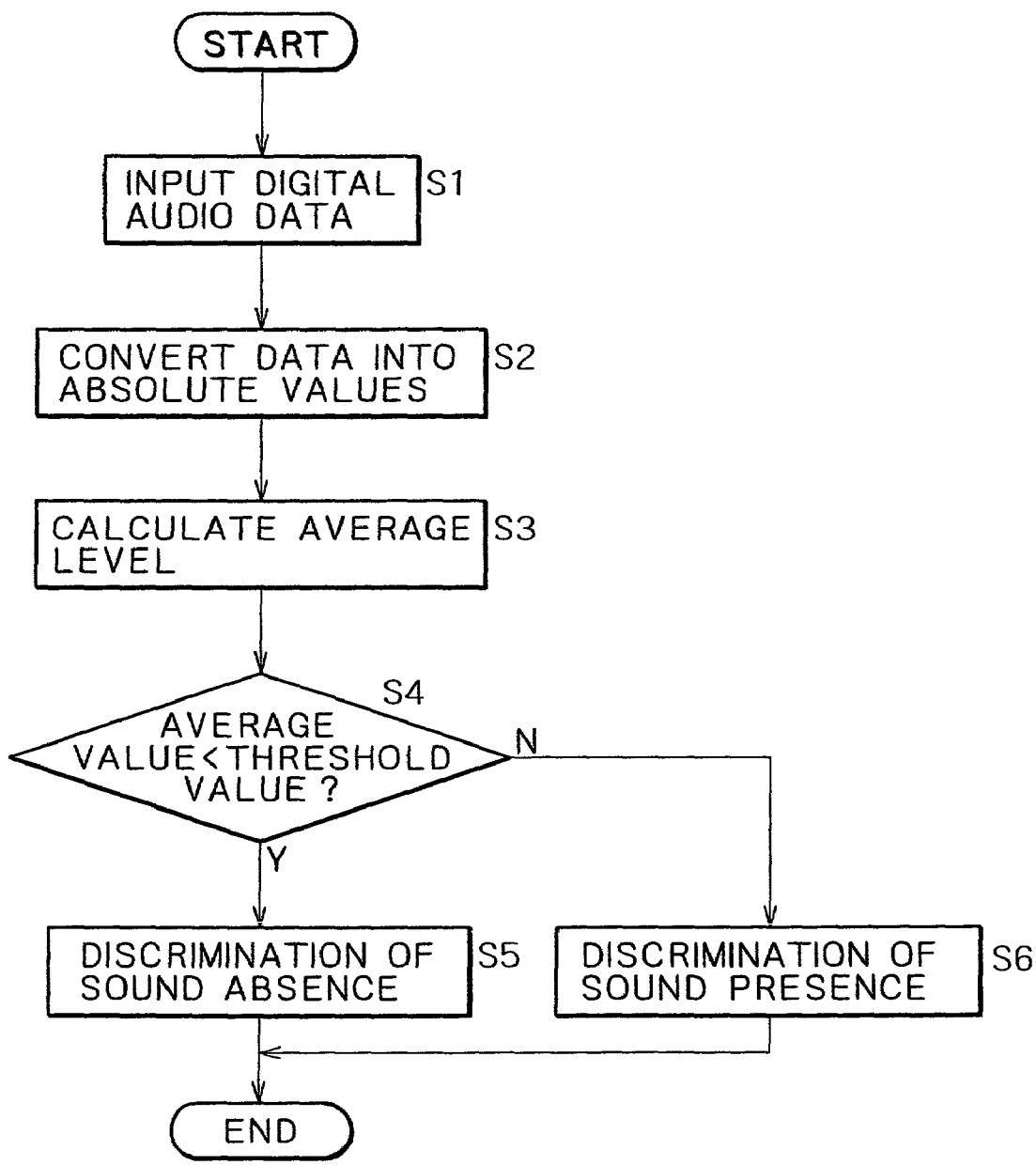
FIG. 5 is a flow chart illustrating the process for detection of a sound absence period.

In step S1 in FIG. 5, the sound absence detection section 38 takes in digital audio data inputted thereto from the audio A/D converter 37, and in step S2, since the digital audio data is processed at a rate of 30 frames per second, the sound absence detection section 38 converts digital audio levels of 16 K/30 samples converted into absolute values. Then in step S3, an average level of the absolute values of the digital audio levels is calculated, and in step S4, it is discriminated whether or not the average level is lower than a predetermined threshold level. If it is discriminated that the average level is lower than the threshold level, then it is determined in step S5 that sound is absent. On the contrary if it is discriminated in step S4 that the average value is equal to or higher than the threshold value, then it is determined in step S6 that sound is present. A result of the determination is outputted to a CM candidate period detection section 39 shown in FIG. 3.

Referring back to FIG. 3, the video signal outputted from the tuner 31 is supplied to a delay section 35 and a scene change detection section 36. The scene change detection section 36 is formed from a frame memory for a predetermined number of frames (for example, one frame). Also the video signal delayed by a time corresponding to the predetermined number of frames by the delay section 35 is supplied to the scene change detection section 36.

Figure 7:
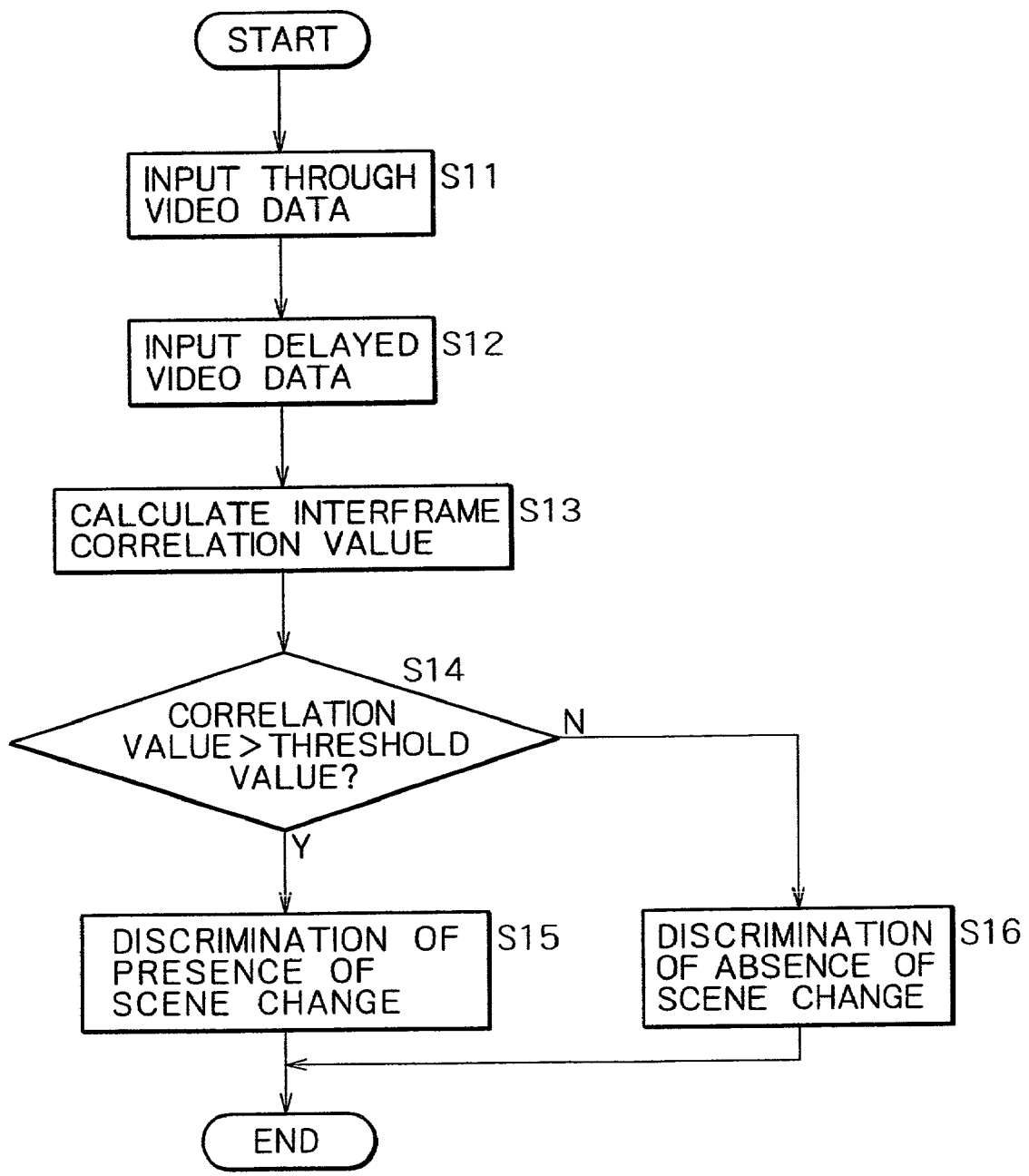
FIG. 7 is a flow chart illustrating a scene change detection process.

Operation of the scene change detection section 36 is described with reference to FIGS. 6 and 7.

The scene change detection section 36 uses detection based on an interframe correlation as a scene change determination method. In step S11 of FIG. 7, the through video signal is supplied to the scene change detection section 36, and in step S12, the video signal delayed by a time corresponding to one frame by the delay section 35 is supplied to the scene change detection section 36. In step S13, the scene change detection section 36 calculates the difference between the through video signal and the delayed video signal for individual pixels and calculates a total value of absolute values of the differences as an interframe correlation value.

In step S14, the scene change detection section 36 discriminates whether or not the interframe correlation value is higher than a predetermined threshold value. If it is determined that the interframe correlation value is higher than the threshold value, then it is determined in step S15 that a scene change has occurred between the frames. On the contrary if it is determined that the interframe correlation value is equal to or lower than the threshold value, then it is determined in step S16 that no scene change has occurred between the frames.

Referring to FIG. 6, it is assumed that the delayed video data and the through video data have an equal image size of n×m, and the coordinate axis in the horizontal direction is represented by i, the coordinate axis in the vertical direction by j, data of coordinates (i, j) in the delayed image by $D_{ij}$, and data of coordinates (i, j) in the through image by $T_{ij}$. The correlation value E between the two images is calculated by the following expression:

$$E = \Sigma\Sigma abs(D_{ij} - T_{ij})$$

where abs is a function of determining an absolute value.

It is to be noted that the scene change detection method is not limited to the detection method based on the interframe correlation, but a commonly known method may be used instead such as (1) a method which uses the correlation of histograms of a brightness signal and a color difference signal of an image, (2) another method wherein a screen is divided into a plurality of regions and the interframe correlation in each region is calculated and then a scene change is detected by decision by majority of the interframe correlation values, or (3) a further method wherein motion vectors between two screens are determined and a scene change is detected from the unification of the motion vectors.

Referring back to FIG. 3, the CM candidate period detection section 39 detects a CM using an audio mode signal (indicating a monaural mode or a stereo mode) outputted from the tuner 31, a sound absence discrimination output from the sound absence detection section 38 and a scene change detection output from the scene change detection section 36 as basic materials.

Figure 9:
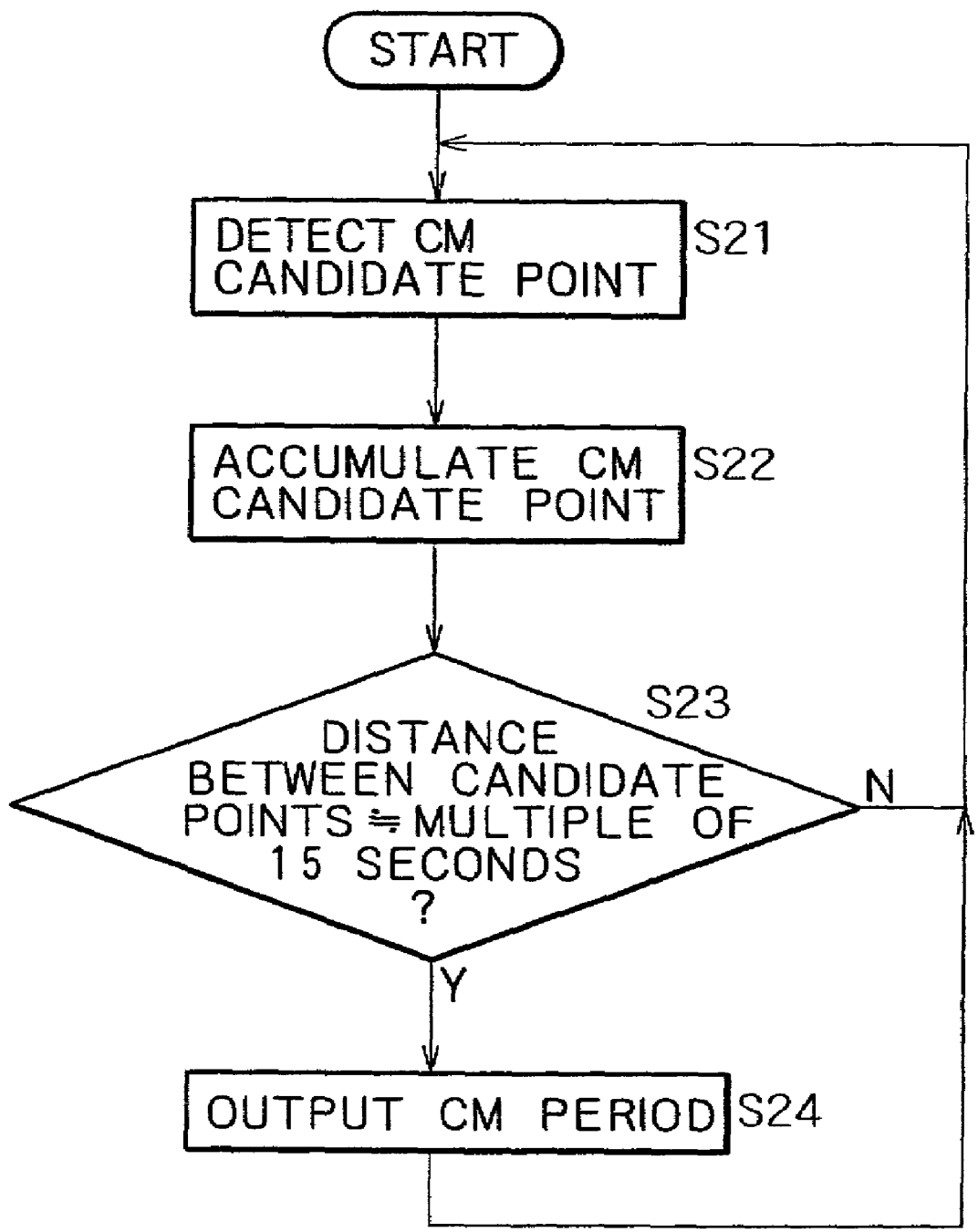
FIG. 9 is a flow chart illustrating a basic CM detection process.

A basic CM detection algorithm is described with reference to FIGS. 8 and 9. In FIG. 8, the first row represents the frame number, and the second row represents the sound absence discrimination output and 0 represents a sound presence output while 1 represents a sound absence output. The third row represents the scene change detection output, and 0 represents a scene change absence output while 1 represents a scene change presence output. The fourth row represents the audio mode output, and 0 represents an output other than a stereo output while 1 represents a stereo output. A frame with regard to which the sound absence discrimination output is 1 (the sound absence discrimination) and the scene change detection output is 1 (the scene change presence) and besides the audio mode output is 1 (the stereo output) is determined as a CM candidate point (step S21 in FIG. 10), and if the interval between two successive CM candidate points determined in this manner (step S22) is 450 frames ±α (step S23), that is, an integral number of times 15 seconds, the period between the CM candidate points is discriminated as a CM period and outputted in step S24. Here, α is a suitable certain allowance. In FIG. 8, the second frame and 452nd frame are determined each as a CM candidate point, and the interval Y between the two frames is detected as a CM period.

Figure 10:
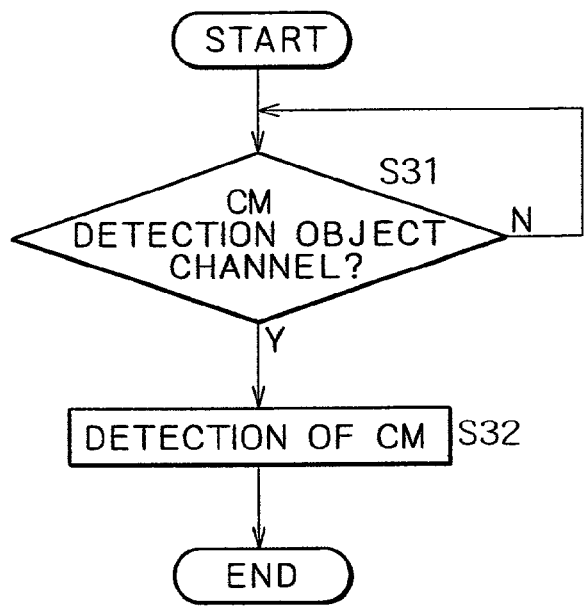
FIGS. 10 and 11 are flow charts illustrating different operations of a detection operation discrimination section shown in FIG. 3.

Now, operation of a detection operation discrimination section 42 when it is known in advance that no CM is included in a broadcast signal is described with reference to FIG. 10. If channel information inputted from the tuner 31 to the CM detection block 34 represents, for example, a channel which is known that it does not broadcast a CM (such as, for example, channels of NHK and WOWOW (both trademarks)), the detection operation discrimination section 42 does not perform its CM detection, that is, does not output a CM detection output. In particular, the detection operation discrimination section 42 discriminates in step S31 whether or not the channel information represents that the channel is an object of CM detection. If the channel is not a CM detection object channel, then the detection operation discrimination section 42 performs a CM detection process in step S32. However, if the channel is a CM detection object channel, then the detection operation discrimination section 42 repeats the discrimination in step S41 and thus waits that the channel information changes to represent that the channel is a CM detection object channel. In this manner, when it is known that a broadcasting signal includes no CM, the CM detection process of the detection operation discrimination section 42 can be omitted.

Figure 11:
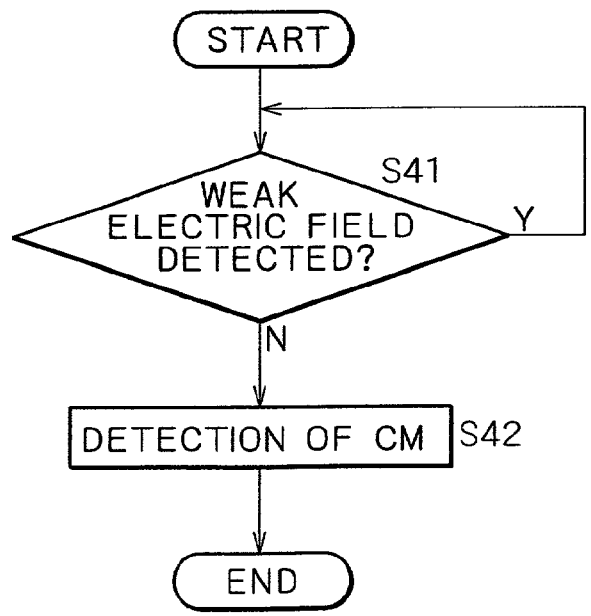

Now, operation of the detection operation discrimination section 42 when the electric field is weak is described with reference to FIG. 11. The detection operation discrimination section 42 receives weak electric field information inputted thereto from the tuner 31. When the electric field is weak, the receive signal has a low signal level and is liable to suffer from noise, and therefore, wrong detection may possibly occur frequently in scene change detection or sound absence detection. Therefore, when the electric field is weak, the detection operation discrimination section 42 does not perform its CM detection, that is, does not output a CM detection output. In particular, the detection operation discrimination section 42 discriminates in step S41 whether or not the electric field is weak. Only when the electric field is not weak, the detection operation discrimination section 42 performs its CM detection process in step S42. Therefore, wrong detection or failure in detection of a CM by the detection operation discrimination section 42 can be prevented.

Figure 12:
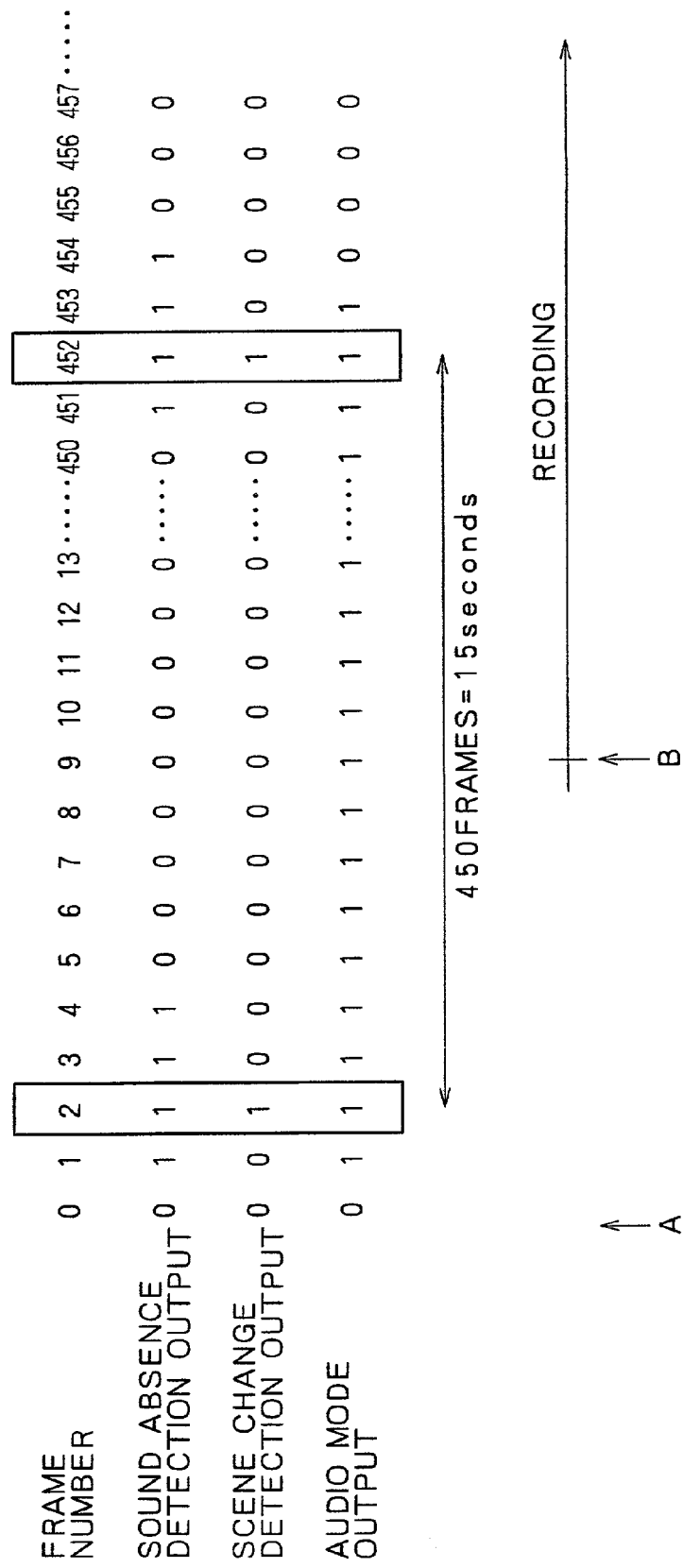
FIGS. 12 and 13 are diagrammatic views illustrating different operations of the detection operation discrimination section shown in FIG. 3.

Now, the operation timing of the CM detection block 34 controlled by the detection operation discrimination section 42 is described with reference to FIG. 12. Where CM detection is performed upon recording and a result of the CM detection is stored into some medium, the CM detection is started not at a point of time when recording is started (at a time point B in FIG. 12) but prior to the time point B (at another time point A in FIG. 12). As a result, even if recording is started during broadcasting of a CM, the CM can be detected. In recording or playback based on timer reservation, CM detection is started prior by a predetermined time T to a point of time at which the recording or playback is to be started. The predetermined time depends upon the longest CM time to be detected. In other words, where a CM of a period shorter than 30 seconds is to be detected, T is set to 30 seconds or more.

Figure 13:
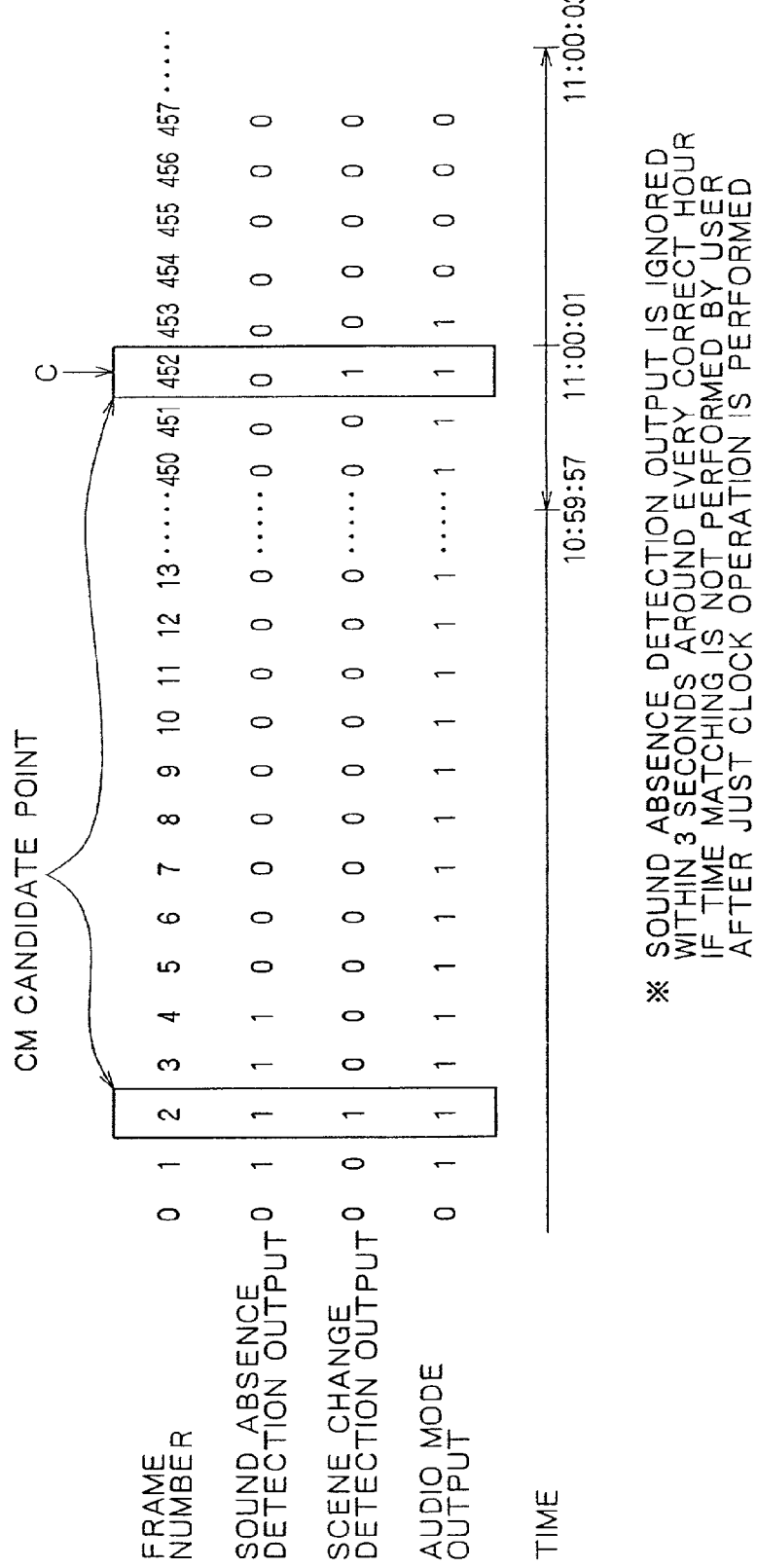
Figure 14:
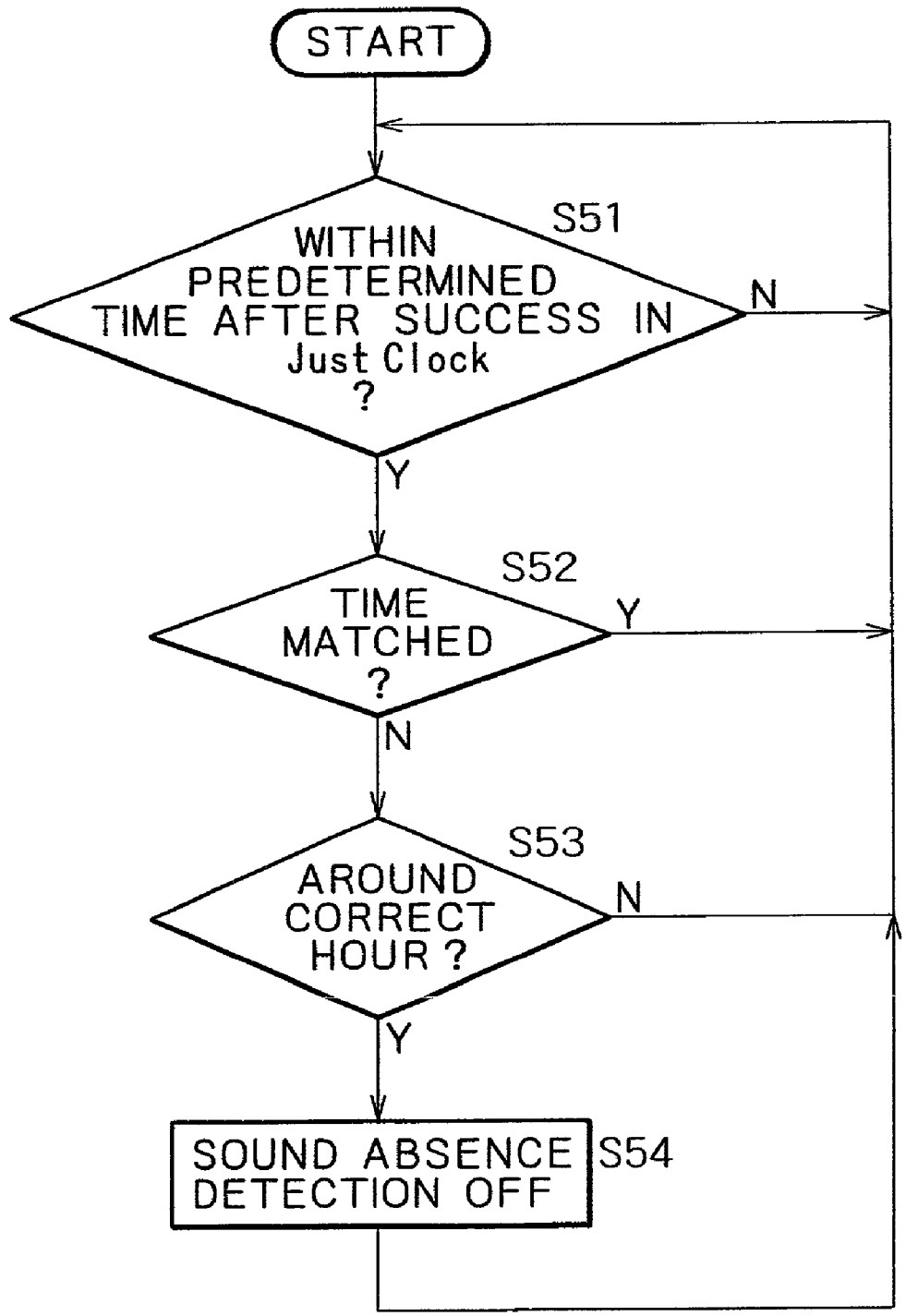
FIG. 14 is a flow chart illustrating a different operation of the detection operation discrimination shown in FIG. 3.

Operation of the detection operation discrimination section 42 where the AV signal recording and playback apparatus has a time matching function called "Just Clock" is described with reference to FIGS. 13 and 14. The time matching function called "Just Clock" detects a time tone broadcast at a particular point of time in a particular channel such as, for example, a time tone broadcast at every noon in the NHK Educational Broadcasting in Japan, and matches the time of the built-in clock with the time tone. Since little error occurs within a predetermined time S (which depends upon the accuracy of quartz or a like element included in the AV signal recording and playback apparatus) after such Just Clock operation is performed, the time of the built-in clock is used.

However, even within the predetermined time S after the Just Clock operation is performed, if time matching by a manual operation of a user is performed, then since the accuracy of the time is unknown, later operation is not performed. In particular, the detection operation discrimination section 42 first discriminates in step S51 whether or not the present time is within the predetermined time S after success in the Just Clock operation and then discriminates in step S52 whether or not time matching is performed by a user. If the present time is not within the predetermined time S in step S51 or time matching is performed by a user within the predetermined time S in step S52, then the processing returns to step S51. Even if the conditions in steps S51 and S52 are satisfied, if the present time is around the hour, then the sound absence detection section 38 does not perform its sound absence detection. In particular, if the detection operation discrimination section 42 discriminates in step S53 that the time of the built-in clock indicates a time within ±β of the hour, then it informs the sound absence detection section 38 of this in step S54. Consequently, the sound absence detection section 38 does not perform sound detection but determines a CM candidate point based only on the interval between scene changes and the sound mode. The value β mentioned above is set, for example, to 3 seconds although it depends also upon the accuracy of the built-in clock. In FIG. 13, the time point C usually is not determined as a CM candidate point because absence of sound is not determined, but if it is around the hour, then since sound absence detection is not used, it is determined as a CM candidate point.

Operation of the detection operation discrimination section 42 when the channel being received is changed over is described with reference to FIGS. 15 to 17. As described hereinabove, CM detection is based on the interval between CM candidate points discriminated by sound absence detection, scene change detection and the sound mode. However, if an input changeover or a channel changeover of the tuner 31 is performed while CM detection is proceeding, candidate points before and after the input changeover point have no relation.

Therefore, if changeover of an input signal occurs, then the CM candidate point is initialized to ignore the CM candidate point in the past. In particular, although the time interval between a time point D and another time point E in FIG. 15 is 15 seconds, since an input changeover occurs within the time interval, the time interval is not detected as a CM period. Then, if the input signal is changed over back to the original channel within a predetermined time γ, then the CM candidate point within the period in the past within which the input signal was the same is used for CM detection again. In particular, although changeover of the input signal occurs within an interval between a time point F and another time point G in FIG. 16, since the time points F and G are CM candidate points detected from the same input signal, a period J and another period L are outputted as a CM period.

FIGS. 17A to 17C illustrate operation of an initialization section 41 of FIG. 3 in the operation just described. Referring to FIGS. 17A to 17C, a frame number and a channel of each CM candidate point are successively recorded first to form a candidate point array. Then, a pointer is placed at each of the top and the tail of the candidate point array, and a pair of multiples of 15 seconds are searched for between the pointers. Basically, the position of the top pointer is changed when the channel is changed over. It is searched whether or not a candidate point of the same channel after the change is present in the past, and if such a candidate point or points are found out, then the position of the top pointer is modified to the position of the oldest (lowest value) one of the tail points. If no candidate point of the same channel in the past is found out, then the top pointer is modified (initialized) to the tail pointer. In FIG. 17A, no candidate point of the channel 4 (4 Ch) is found out, and therefore, the top pointer is moved from the position A to the position C.

In FIG. 17B, at the position E at which the channel is changed over similarly, the top pointer is changed to the position D, and at the position G, the top pointer is changed to the position F. Here, although the interval between the frame of the frame number 550 and the frame of the frame number 100 is 450 frames and corresponds to 15 seconds, since the 100th frame is prior to the top pointer, it is not considered as an object of CM detection.

In FIG. 17C, since the channel is changed over at the position H, the top pointer is changed. However, since candidate points of the same channel 4 are present prior to the position H, the top pointer is moved to the frame of the frame number 200 which is the oldest one of the candidate points. The distance between the frame of the frame number 200 and the frame of the frame number 650 is 450 frames and the channels of the frames are the same channel 4, and therefore, the interval between the frames is discriminated as a CM period. However, although the distance between the frame of the frame number 250 and the frame of the frame number 700 is 450 frames, since the channels of the frames are different from each other, the interval between the frames is not discriminated as a CM period.

FIG. 18 illustrates a playback method which uses CM information recorded on the recording medium 45 together with an AV signal. In particular, when a recorded AV signal is to be played back, it is possible, for example, to play back the AV signal skipping only CM periods, play back the AV signal only in such CM periods, play back only a particular CM or apply a special effect only within a CM period or periods based on CM information recorded on the recording medium on which the AV signal is recorded or on a different external recording medium.

For example, the operation for playing back an AV stream skipping only CM periods can be realized by supplying the AV stream except the CM periods to a demultiplexer or a decoder. In particular, in FIG. 18, the AV stream is inputted to a demultiplexer only within a period indicated by each double-sided arrow mark of a solid line (non-CM period). Where the AV stream is that of the MPEG 2 format, each non-CM period can be cut out from the AV stream based on time stamps at the top and the tail of each CM period.

As described above, the AV signal recording and playback apparatus to which the present invention is applied does not perform CM detection from a broadcast signal when it is known that the broadcast signal includes no CM. Consequently, wrong detection of a CM can be prevented.

Further, the AV signal recording and playback apparatus to which the present invention is applied does not perform CM detection when a weak electric field is detected. Consequently, wrong detection of a CM can be prevented.

Furthermore, the AV signal recording and playback apparatus to which the present invention is applied starts CM detection prior by a predetermined time to start of recording of the AV signal. Consequently, a detection miss of a CM can be prevented.

Further, the AV signal recording and playback apparatus to which the present invention is applied ignores, if the time of the built-in clock is almost correct, detection of sound absence around the hour, but performs CM detection based only on the interval between scene changes of an image and the audio mode. Consequently, occurrence of such a situation that, when CM detection is performed in accordance with the rule that a CM period has sound absence portions at the top and the tail thereof, the CM detection ratio around the hour is deteriorated by the sound of a time tone which is broadcast very frequently around every hour can be prevented.

Furthermore, the AV signal recording and playback apparatus to which the present invention is applied returns the applicable parameter or parameters to a stored parameter or parameters when the input signal returns to an original signal within a predetermined time. Consequently, when the signal being inputted is changed over, or more particularly when the channel or the input currently selected is changed over, the parameter or parameters to be used for CM detection are all initialized, and therefore, wrong correction arising from a signal having no correlation decreases. Here, if the parameter or parameters are initialized every time the signal is changed over, then occurrence of such a situation that, if an operation for returning the input signal (channel) to the original signal (channel) within a predetermined time is performed during a CM period, then undetection of the CM can be prevented.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium may be formed as a package medium such as, as shown in FIG. 3, a magnetic disk 49 (including a floppy disk), an optical disk 50 (including a CD-ROM (Compact Disc-Read Only Memory) and a DVD (Digital Versatile Disc)), a magneto-optical disk 51 (including an MD (Mini-Disc)), or a semiconductor memory 52 which has the program recorded thereon or therein and is distributed in order to provide the program to a user separately from a computer, or as a ROM or a hard disk which has the program recorded therein or thereon and is provided to a user in a form wherein it is incorporated in a computer in advance.

It is to be noted that, in the present specification, the steps which describe the program recorded in or on a recording medium may be but need not necessarily be processed in a time series in the order as described, and include processes which are executed parallelly or individually without being processed in a time series.

Further, in the present specification, the term "system" is used to represent an entire apparatus composed of a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. A television program signal recording and playback apparatus for recording and playing back a television program signal onto and from an information recording medium, comprising:
   sound absence period detection means for detecting a sound absence period of an audio signal included in the television program signal;
   audio mode detection means for detecting an audio mode of the audio signal of the television program signal;
   scene changing point detection means for detecting a scene changing point of a video signal included in the television program signal;
   scene changing point distance measurement means for measuring the distance between scene changing points successively detected by said scene changing point detection means;
   commercial message detection means for using at least one of the sound absence period, the audio mode and the distance between scene changing points as a parameter to detect a commercial message included in the television program signal;
   commercial message detection control means for controlling said commercial message detection means;
   sound absence period detection control means for controlling said sound absence period detection means; and
   initialization means for initializing the parameter or parameters, wherein said commercial message detection control means limits the processing of said commercial message detection means when the television program signal includes no commercial message.

2. A television program signal recording and playback apparatus according to claim 1, wherein said commercial message detection control means limits the processing of said commercial message detection means when the television program signal has a low signal level.

3. A television program signal recording and playback apparatus according to claim 1, wherein said commercial message detection control means controls said commercial message detection means to start processing before recording of the television program signal is started.

4. A television program signal recording and playback apparatus according to claim 1, wherein said sound absence period detection control means limits the processing of said sound absence period detection means at a predetermined point of time.

5. A television program signal recording and playback apparatus according to claim 1, wherein said initialization means initializes the parameter or parameters when discontinuity occurs with the television program signal.

6. A television program signal recording and playback apparatus according to claim 1, wherein said initialization means restores the initialized parameter or parameters when the television program signal recovers after discontinuity occurs with the television program signal.

7. A television program signal recording and playback method for a television program signal recording and playback apparatus for recording and playing back a television program broadcast signal onto and from an information recording medium, comprising:
- a sound absence period detection step of detecting a sound absence period of an audio signal included in the television program signal;
- an audio mode detection step of detecting an audio mode of the audio signal of the television program signal;
- a scene changing point detection step of detecting a scene changing point of a video signal included in the television program signal;
- a scene changing point distance measurement step of measuring the distance between scene changing points successively detected by the processing in the scene changing point detection step;
- a commercial message detection step of using at least one of the sound absence period, the audio mode and the distance between scene changing points as a parameter to detect a commercial message included in the television program signal;
- a commercial message detection control step of controlling the processing of the commercial message detection step;
- a sound absence period detection control step of controlling the processing of the sound absence period detection step; and
- an initialization step of initializing the parameter or parameters, wherein said commercial message detection control means limits the processing of said commercial message detection means when the television program signal includes no commercial message.

8. A recording medium on which a computer-readable program for controlling a television program signal recording and playback apparatus for recording and playing back a television program signal onto and from an information recording medium is recorded, when the program is executed by a processor, the program performs a process including steps comprising:
- a sound absence period detection step of detecting a sound absence period of an audio signal included in the television program signal;
- an audio mode detection step of detecting an audio mode of the audio signal of the television program signal;
- a scene changing point detection step of detecting a scene changing point of a video signal included in the television program signal;
- a scene changing point distance measurement step of measuring the distance between scene changing points successively detected by the processing in the scene changing point detection step;
- a commercial message detection step of using at least one of the sound absence period, the audio mode and the distance between scene changing points as a parameter to detect a commercial message included in the television program signal;
- a commercial message detection control step of controlling the processing of the commercial message detection step;
- a sound absence period detection control step of controlling the processing of the sound absence period detection step; and
- an initialization step of initializing the parameter or parameters, wherein said commercial message detection control means limits the processing of said commercial message detection means when the television program signal includes no commercial message.

9. A television program signal recording and playback apparatus for recording and playing back a television program signal onto and from an information recording medium, comprising:
- a sound absence period detection device configured to detect a sound absence period of an audio signal included in the television program signal;
- an audio mode detection device configured to detect an audio mode of the audio signal of the television program signal;
- a scene changing point detection device configured to detect a scene changing point of a video signal included in the television program signal;
- a scene changing point distance measurement device configured to measure the distance between scene changing points successively detected by said scene changing point detection device;
- a commercial message detection device configured to use at least one of the sound absence period, the audio mode and the distance between scene changing points as a parameter to detect a commercial message included in the television program signal;
- a commercial message detection control device configured to control the commercial message detection device;
- a sound absence period detection control device configured to control the sound absence period detection device; and
- an initialization device configured to initialize the parameter or parameters, wherein said commercial message detection control device limits the processing of said commercial message detection device when the television program signal includes no commercial message.

* * * * *

UNITED STATES PATENT AND TRADEMARK OFFICE
CERTIFICATE OF CORRECTION

| | | |
|---|---|---|
| PATENT NO. | : 7,079,751 B2 | Page 1 of 1 |
| APPLICATION NO. | : 09/903163 | |
| DATED | : July 18, 2006 | |
| INVENTOR(S) | : Taro Suito et al. | |

It is certified that error appears in the above-identified patent and that said Letters Patent is hereby corrected as shown below:

Column 11, line 13, change "program broadcast signal" to --program signal--.

Signed and Sealed this

Twenty-fifth Day of March, 2008

JON W. DUDAS
*Director of the United States Patent and Trademark Office*